(12) United States Patent
Iwanaga et al.

(10) Patent No.: US 6,223,624 B1
(45) Date of Patent: May 1, 2001

(54) PARKING BRAKE DEVICE

(75) Inventors: Yoshihisa Iwanaga, Aichi-ken; Satoru Masuda, Kanagawa-ken, both of (JP)

(73) Assignees: Kabushiki Kaisha Toyoda Jidoshokki Seisakusho, Kariya; Otsuka Koki Co., Ltd., Yokohama, both of (JP)

( * ) Notice: Subject to any disclaimer, the term of this patent is extended or adjusted under 35 U.S.C. 154(b) by 0 days.

(21) Appl. No.: 09/366,492

(22) Filed: Aug. 3, 1999

(30) Foreign Application Priority Data

Aug. 4, 1998 (JP) .................................................. 10-220712

(51) Int. Cl.⁷ ...................................................... B60T 7/08
(52) U.S. Cl. ............................................. 74/529; 74/538
(58) Field of Search ............................ 74/529, 535, 536, 74/537, 538, 501.5 R (56) References Cited

U.S. PATENT DOCUMENTS 4,854,187 * 8/1989 Walters .................................. 74/535
5,272,935 * 12/1993 Heinemann et al. ............... 74/535 X

FOREIGN PATENT DOCUMENTS 5-4565   1/1993 (JP) .
9-52570  2/1997 (JP) .
WO93/19958 * 10/1993 (WO) .............................. 74/501.5 R

* cited by examiner

Primary Examiner—Mary Ann Green
(74) Attorney, Agent, or Firm—Morgan & Finnegan, LLP

(57) ABSTRACT

A parking brake device includes a base member and at least one cable connected to a braking system at one end. The other end of the cable is connected to a connecting member. The connecting member is slidably supported by the base member. A brake lever is rotatably attached to the base member so as to be erectable around a position in the vicinity of an extension extending in the sliding direction of the connecting member. A junction member is rotatably connected to the connecting member at one end. The other end of the connecting member is connected to at least one moving member to which the junction member is rotatably attached. The moving member is moveably attached to the brake lever. An adjustment mechanism is provided outside the brake lever. The adjusting mechanism adjusts the tension of the cable through the junction member and the connecting member by changing the position of the moving member.

5 Claims, 6 Drawing Sheets

PARKING BRAKE DEVICE

BACKGROUND OF THE INVENTION

1. Field of the Invention

The present invention relates to parking brake devices and, more particularly, to a parking brake device for adjusting the tension of cables connected to a braking system.

2. Description of the Related Art

Figure 5:
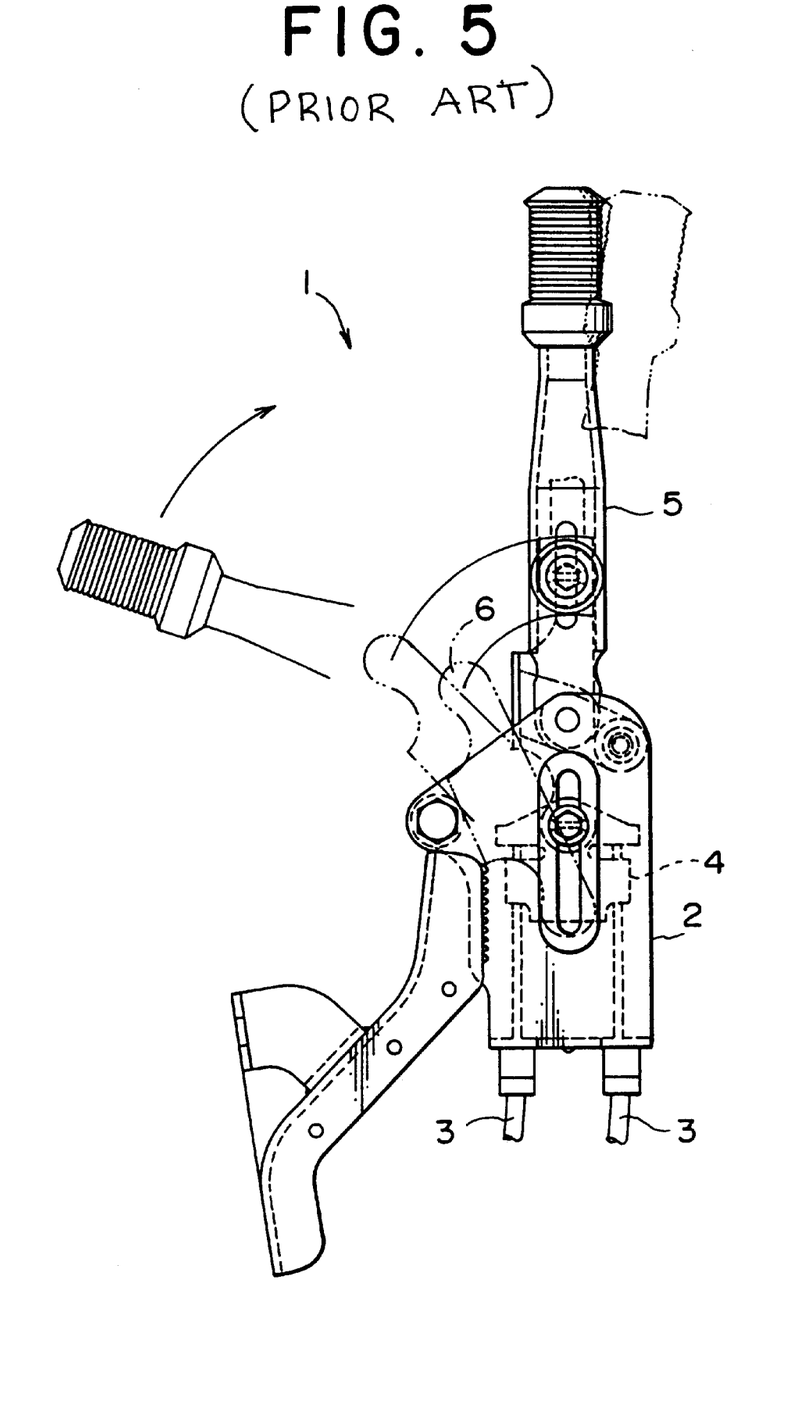
FIG. 5 is a side view showing a conventional parking brake device.
Figure 6:
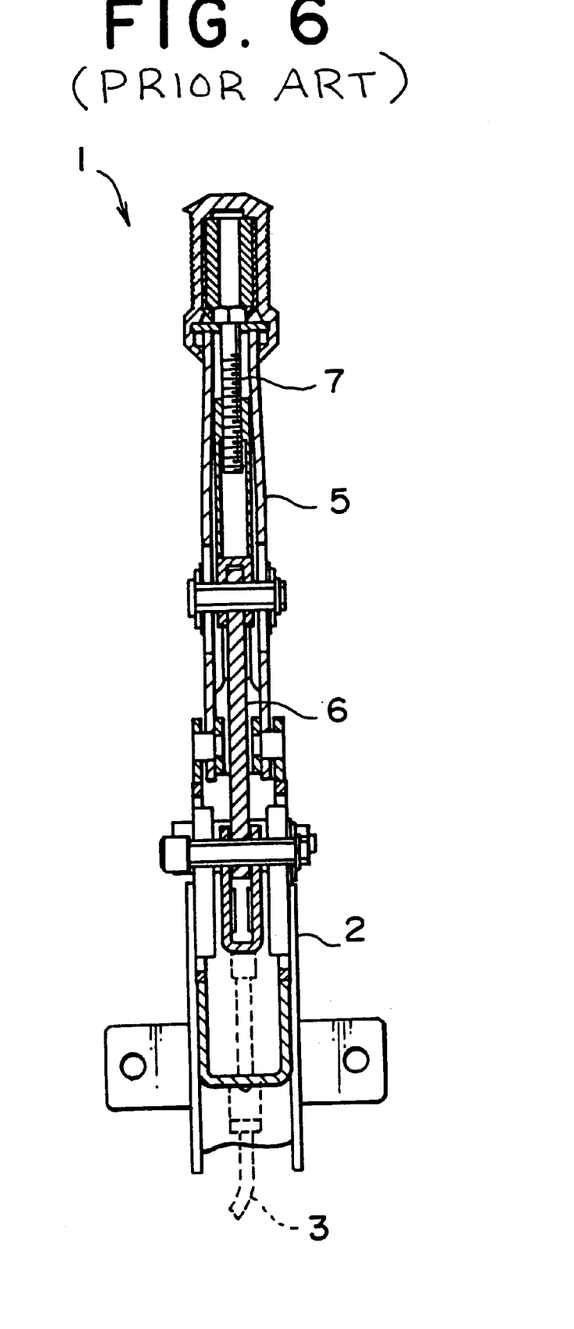
FIG. 6 is a front view showing the conventional parking brake device.

As an exemplary conventional parking brake device of this type, a toggle link type such as shown in FIGS. 5 and 6 is available.

That is, a parking brake device 1 is constructed as follows. A vertically moving bracket 4 to which cables 3 are connected is slidably supported by a base member 2, and a brake lever 5 is rotatably attached in the vicinity of an extension extending in the direction of the vertical motion of the bracket 4 in such a manner that the lever 5 is erectable. A toggle mechanism is formed by connecting the middle portion of the brake lever 5 to the vertically moving bracket 4 through a link 6 which is a junction member. The length of the cables 3 is adjusted by moving the link 6 through the adjustment of an adjust bolt 7.

However, the thus constructed conventional parking brake device is neither satisfactory in adjusting operability nor easily maintained, since the tension adjusting mechanism for the cables 3, which is constructed of the adjust bolt 7 and the like, is arranged within the brake lever 5.

Further, the conventional parking brake device has a limited degree of freedom in construction, which in turn limits the range of its general-purpose use. In addition, the device may, in some cases, be redesigned depending on its mounting conditions, and this increases the manufacturing cost.

SUMMARY OF THE INVENTION

The present invention has been made in view of the aforementioned conventional problems, and the object thereof is therefore to provide a parking brake device having an improved adjusting operability for a cable tension adjusting mechanism and a wider range of general applicability with an increased degree of freedom in construction by arranging the cable tension adjusting mechanism outside a brake lever.

According to the present invention, there is provided a parking brake device comprising: a base member; at least one cable connected to a braking system at one end thereof; a connecting member to which the cable is connected at the other end thereof, the connecting member being slidably supported by the base member; a brake lever rotatably attached to the base member so as to be erectable around a position in the vicinity of an extension extending in the sliding direction of the connecting member; a junction member rotatably connected to the connecting member at one end thereof; at least one moving member to which the junction member is rotatably attached at the other end thereof, the moving member being movably attached to the brake lever; and adjusting means, provided outside the brake lever, for adjusting the tension of the cable through the junction member and the connecting member by changing the position of the moving member.

DESCRIPTION OF THE PREFERRED EMBODIMENTS

Embodiment

An embodiment of the present invention will now be described with reference to the drawings.

FIGS. 1 to 4 show an embodiment of the present invention.

Figure 1:
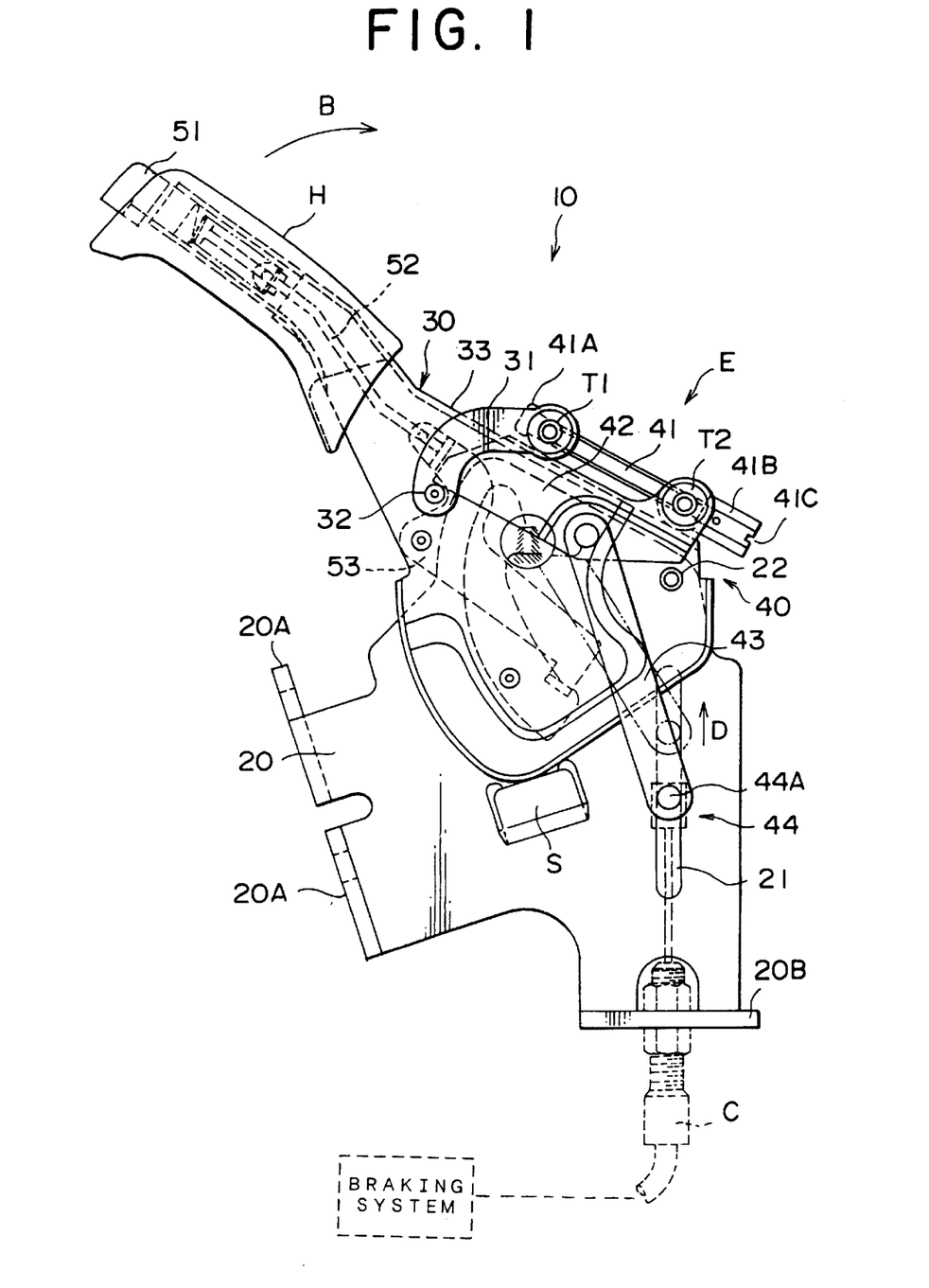
FIG. 1 is a side view showing a parking brake device according to an embodiment of the present invention.

As shown in FIG. 1, a parking brake device 10 is constructed as follows. A connecting member 44 to which cables C are connected is slidably supported by a base member 20, and a brake lever 30 is attached pivotably on an attaching portion 22 that is located in the vicinity of an extension extending in the direction of vertically moving the connecting member 44 so that the brake lever 30 is erectable. A toggle mechanism is formed by connecting the middle portion of the brake lever 30 and the connecting member 44 through a junction member 43.

A handle H is provided on the distal end of the brake lever 30 so that the operator can grip the lever 30 easily during operation. Provided on the top of the handle H is an unlock button 51, which is used to unlock the brake lever 30 which is locked for maintaining the braking action. An unlock rod 52 is connected to the unlock button 51. The other end of the unlock rod 52 is connected to a lock plate 53.

The base member 20 is fixed to a predetermined place by bolts or the like at its fixing portions 20A and 20A. A vertically elongated slide hole 21 is formed in the base member 20, and a slide pin 44A, which constitutes the connecting member 44, is slidably inserted into the slide hole 21. A cable attaching portion 20B is also provided on the base member 20. The portion 20B serves to guide wires W, which constitute the cables C, straightly towards the slide pin 44A in the same direction as the longitudinal direction of the slide hole 21. Between the fixing portions 20A and the slide hole 21 a stopper S is provided. The stopper S supports the brake lever 30 while brought into contact with the brake lever 30 when the parking brake system is not set into action. For example, the portion of the stopper S which comes in contact with the brake lever 30 is made of a hard rubber.

A tension adjusting mechanism 40 adjusts the tension of the cables C by changing the position of the junction member 43. The mechanism 40 includes adjusting link members 42 that are connected to the junction member 43 so as to be interposed between the brake lever 30 and the junction member 43, regulating link members 31 that hold the adjusting link members 42, and a screw member 41 that regulates the position of the adjusting link members 42.

Figure 3:
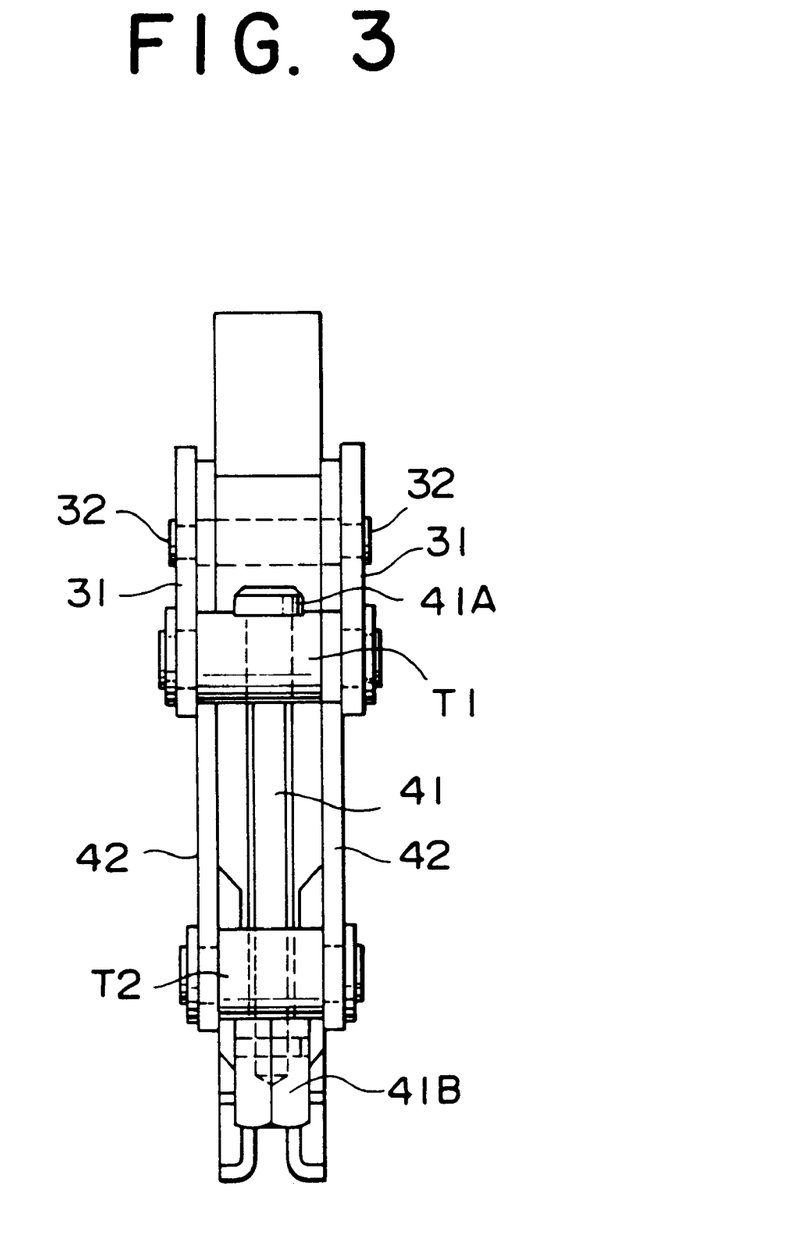
FIG. 3 is a diagram of FIG. 1 as viewed in the direction indicated by the arrow E.
Figure 4:
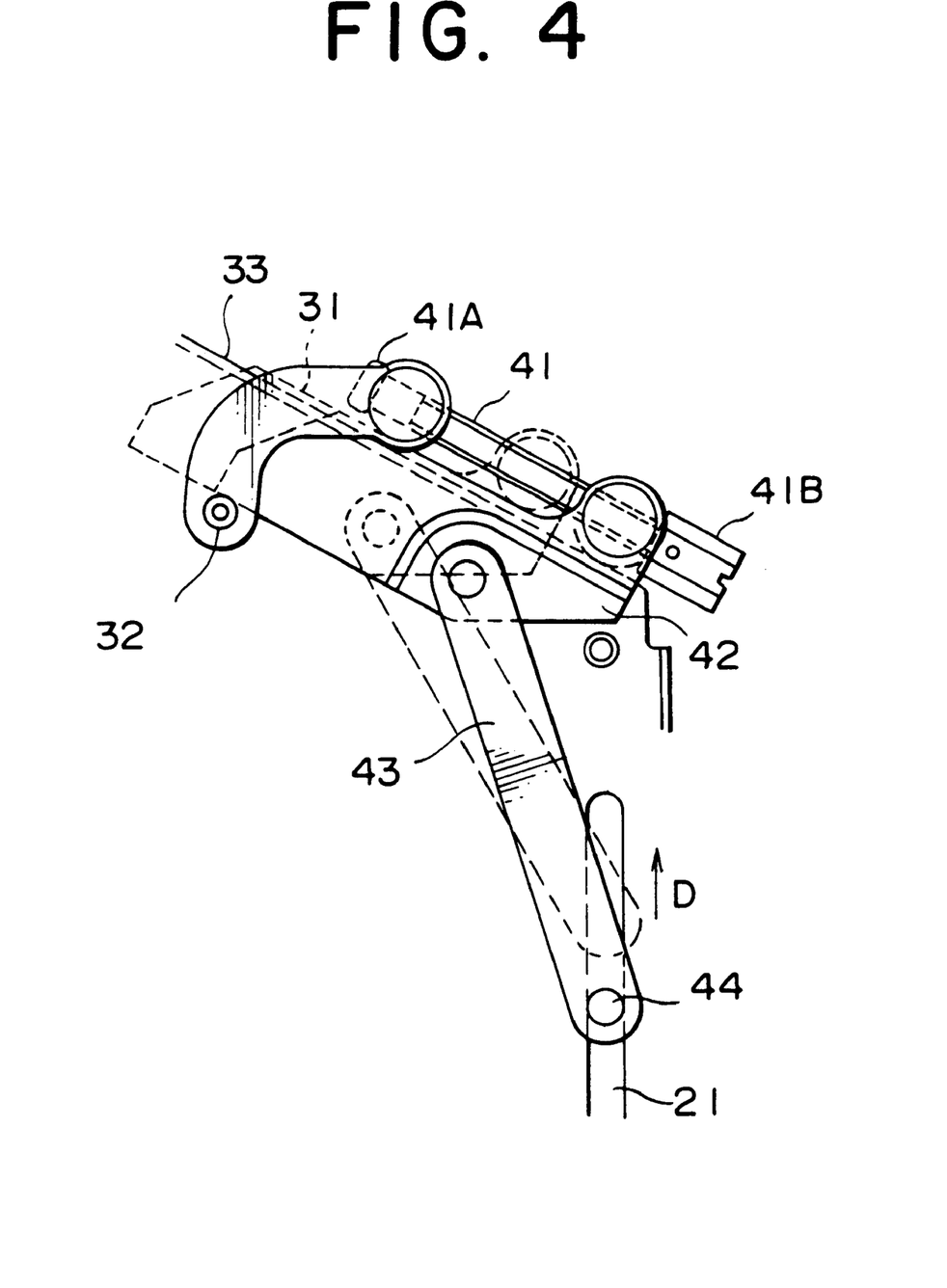
FIG. 4 is a partially enlarged view of FIG. 1 showing a cable tension adjusting mechanism of the parking brake device according to the embodiment of the present invention.

The regulating link members 31 and 31 are curved platelike links arranged so as to be paired on both sides of the brake lever 30. Their proximal end portions are attached to the middle portion of the brake lever 30 so as to be pivotable on connecting pins 32, and their other end portions are extended so as to project from a side end edge 33 of the brake lever 30. As shown in FIGS. 3 and 4, the regulating link members 31 and 31 are attached to the brake lever 30 by the connecting pins 32 at one end side thereof. The other end portions of the regulating link members 31 and 31 rotatably support both ends of a first trunnion pin T1 so as to clamp the first trunnion pin T1 therebetween. The first trunnion pin T1 is located at such a position as to come in contact with the side end edge 33 of the brake lever 30.

As shown in FIGS. 1, 3 and 4, the adjusting link members 42 and 42 are located behind the regulating link members 31 and 31 when viewed with respect to the handle H of the brake lever 30. The adjusting link members 42 and 42 are plates attached to both sides of the base portion of the brake lever 30. The junction member 43 is connected to one end of each adjusting link member 42. The plates on both sides are connected through a second trunnion pin T2 that comes in slidable contact with the side end edge 33 of the brake lever 30. The other end of each adjusting link member 42 is inserted between the first trunnion pin T1 and the connecting pin 32 by which the regulating link member 31 is attached to the brake lever 30, and is supported by the connecting pin 32 while the member 42 is in contact with the connecting pin 32. The condition in which the adjusting link members 42 and 42 are inserted between the connecting pins 32 and the first trunnion pin T1 is maintained even if their distance with respect to the regulating link members 31 and 31 is maximized. As described above, the adjusting link members 42 and 42 are arranged on the brake lever 30 at a position deviated from an output axial line A that extends in the direction of pulling the cables C in such a manner that the members 42 can be movably adjusted along the output axial line A.

The screw member 41 is a boltlike member as shown in FIGS. 1 to 4, and one end (distal end) thereof is inserted into the first trunnion pin T1. A detachment preventing portion 41A for preventing the screw member 41 from being detached from the first trunnion pin T1 is provided on the distal end of the screw member 41. The portion 41A is made larger than the through hole of the first trunnion pin T1 into which the screw member 41 is inserted. The screw member 41 is threaded from the middle portion to the proximal end thereof. The proximal end side of the screw member 41 passes through the second trunnion pin T2, and its threaded portion is screwed into the second trunnion pin T2.

A gripping portion 41B for turning the screw member 41 is secured to the proximal end of the screw member 41. The gripping portion 41B is formed into such dimensions and shape (as to be a hexagon nut in this embodiment) as not to get into the threaded hole of the second trunnion pin T2 and as to be easily gripped. The gripping portion 41B has a slot 41C in the case where a screwdriver is used to turn the screw member 41.

Thus, the screw member 41 is interposed between the adjusting link members 42 and the brake lever 30, and its screwing action changes the distance between the first trunnion pin T1 and the second trunnion pin T2, thereby regulating the adjusting link members 42 while changing the position of the adjusting link members 42.

Figure 2:
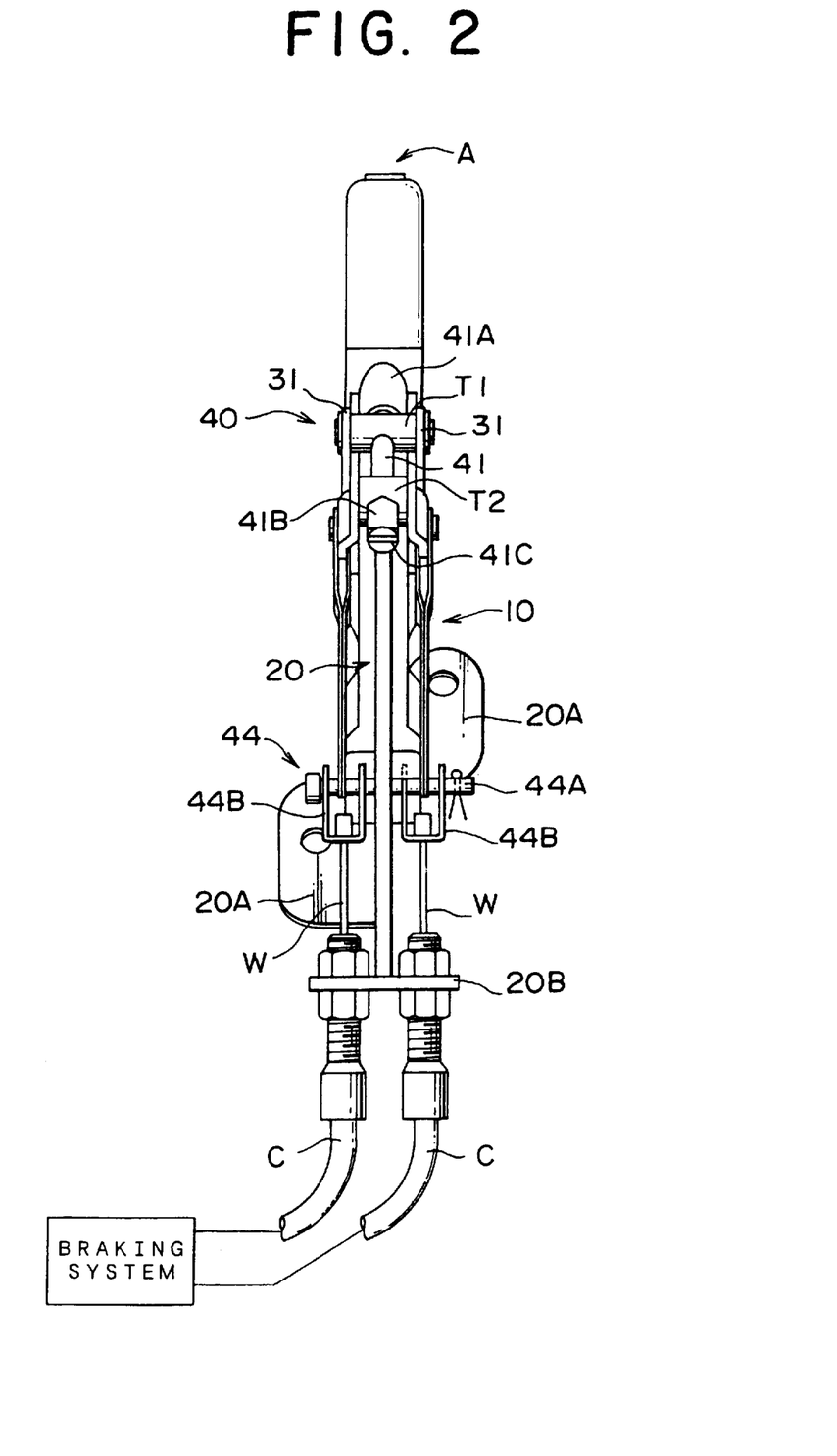
FIG. 2 is a front view showing the parking brake device according to the embodiment of the present invention.

While one end of the junction member 43 is rotatably attached to the adjusting link members 42, the other end of the member 43 rotatably supports the slide pin 44A of the connecting member 44, with the pin 44A passing through the slide hole. As shown in FIG. 2, intermediate members 44B and 44B are attached to the slide pin 44A so as to be symmetric with respect to the base member 20. The wires W and W of the cables C and C are connected to these intermediate members 44B and 44B, respectively. The other end of each cable C is connected to a braking system (not shown).

Next, the operation of the parking break device will be described.

In FIG. 1, when the parking brake device 10 is to be operated for braking, the operator grips the handle H and pulls it up in a direction indicated by the arcuate arrow B, so that the brake lever 30 moves up while pivoting on the attaching portion 22. When the junction member 43 is pulled upward as the brake lever 30 pivots, the slide pin 44A attached to the lower end of the junction member 43 is pulled upward along the slide hole 21 in the direction indicated by the arrow D of FIG. 1.

The slide pin 44A reaches the highest position within the slide hole 21 when the junction member 43 and the slide hole 21 coincide with each other along their length. At this instance, the brake lever 30 passes through the dead point of the toggle mechanism. The braking force of the brake system as well as the force for returning the brake lever 30 is increased as the brake lever 30 is pulled up to the dead point, while when passing over the dead point, the brake lever 30 no longer returns even if a strong force is applied to the connecting member 44 that connects the cables C. At this instance, the wires W of the cables C attached to the slide pin 44A through the intermediate members 44B and 44B are pulled, thereby operating the braking system to set the brake into action. Note that the brake lever 30 that is in contact with the stopper S at this instance moves away from the stopper S.

The lock plate 53 maintains the condition in which the brake lever 30 is pulling the cables C.

To release the working brake, the unlock button 51 is pressed, so that the unlock rod 52 moves the lock plate 53 to release the locked condition, and under such a condition, the brake lever 30 is brought down in the direction opposite to the direction indicated by the arrow B. The brake lever 30 can be brought down up to the dead point with a relatively small force. When passing over the dead point while receiving a force, the brake lever 30 is then pulled by the tension of the wires W and W, and hence the brake lever 30 can be easily brought down to the position where it comes in contact with the stopper S. When the brake lever 30 is returned to the position where it comes in contact with the stopper S, the cables C are no longer tense, thereby not operating the braking system and hence releasing the action of the brake.

Described next is the case where the tension of the cables C is adjusted by the cable tension adjusting mechanism 40 in order to adjust the effect of the braking action.

When the brake is not working, the cables C are not tense at all, or are not tense enough to operate the braking system. Therefore, the slide pin 44A to which the cables C are connected can move vertically along the slide hole 21 easily.

At this instance, when the screw member 41 of the tension adjusting mechanism 40 is turned rightward (if the screw member 41 is threaded similarly to a right-handed screw), the second trunnion pin T2 into which the screw member 41 is screwed does not turn in the direction of turning the screw member 41 since the second trunnion pin T2 has both ends thereof rotatably supported by the adjusting link members 42 and 42. Therefore, as shown by the dashed lines in FIG. 4, the second trunnion pin T2 moves in such a direction as to come closer to the first trunnion pin T1. At this instance, the adjusting link members 42 and 42 move together with the second trunnion pin T2 while maintaining their condition in which they are brought into contact with and supported by the connecting pins 32 through which the regulating link members 31 are attached to the brake lever 30. When the adjusting link members 42 have moved, the junction member 43, one of whose ends is rotatably supported by the adjusting link members 42, is pulled by the members 42, thereby causing the slide pin 44A to slide along the slide hole 21 in the direction indicated by the arrow D in FIGS. 1 and 4.

Since the wires W and W of the cables C are connected to the slide pin 44A, the wires W and W are pulled as the slide pin 44A slides, thereby adjusting the tension of the cables C when the brake is working. That is, the braking force of the braking system can be adjusted.

The screw member 41 is inserted into the second trunnion pin T2, and the detachment preventing portion 41A is arranged on the distal end of the screw member 41 that passes through the first trunnion pin T1. Therefore, even if the brake lever 30 is operated, the distance between the second trunnion pin T2 and the first trunnion pin T1 does not widen, and hence the parking brake device 10 can be operated with the cables C adjusted to a desired length.

When the length of the cables C is to be adjusted so that the cables become longer in order to decrease the braking force by decreasing the tension of the cables C when the brake is working, the screw member 41 is turned in the direction opposite to the aforementioned direction with the brake released, thereby moving the second trunnion pin T2 away from the first trunnion pin T1 by a desired distance. As a result of this operation, the cables c become longer on the contrary to the aforementioned case, and hence the braking force can be decreased. The distance between the portion at which the adjusting link members 42 are attached to the junction member 43 and the attaching portion 22 of the brake lever 30 is decreased, and this decreases the distance by which the slide pin 44A moves in the direction D when the brake lever 30 is turned by the same angle, and hence the braking force is decreased.

As described above, in the parking brake device 10, the cables C are connected, and the tension adjusting mechanism 40 for adjusting the tension of these cables C is located so as to deviate from the output axial line A, which extends in the direction of pulling the cables C when the brake lever 30 is operated. Therefore, the device 10 can improve the tension adjusting operability and hence the maintainability.

Further, the degree of freedom in layout is increased, and hence the range of the general applicability of the device 10 can be increased.

While the screw member 41 is threaded on its proximal end side and screwed into the second trunnion pin T2 at its proximal end side, and its distal end side is inserted into the first trunnion pin T1, the screw member 41 may be inserted into the second trunnion pin T2 without threading its proximal end side, and threaded on its distal end side and screwed into the first trunnion pin T1 at its distal end side.

Further, while the tension adjusting mechanism 40 includes a trunnion pin clamped between a pair of link members, another trunnion pin clamped between another pair of link members and a screw member connecting the two trunnion pins so as to adjust the distance between the trunnion pins, a similarly operating slide mechanism may be used.

According to the parking brake device of the present invention, the cable tension adjusting mechanism is located so as to deviate from the output axial line A that extends in such a direction as to allow the mechanism to be pulled by the cables C or to return. As a result of this construction, the parking brake device provides excellent adjusting operability and easy maintenance. In addition, the general applicability of the device will be improved, and this in turn can reduce its manufacturing cost.

What is claimed is:

1. A parking brake device, comprising:

a base member;

at least one cable connected to a braking system at one end thereof;

a connecting member to which said cable is connected at the other end thereof, said connecting member being slidably supported by said base member;

a brake lever rotatably attached to said base member so as to be erectable around a position in the vicinity of an extension extending in the sliding direction of said connecting member;

a junction member rotatably connected to said connecting member at one end thereof;

at least one moving member to which said junction member is rotatably attached at the other end thereof, said moving member being movably attached to said brake lever; and adjusting means, provided outside said brake lever, for adjusting the tension of said cable through said junction member and said connecting member by changing the position of said moving member.

2. A parking brake device according to claim 1, wherein said adjusting means comprises a screw member, interposed between said moving member and said brake lever, for moving the position of said moving member while rotating.

3. A parking brake device according to claim 2, wherein said adjusting means comprises:

a connecting pin attached to said brake lever;

a pair of support members, respectively provided on both sides of a base portion of said brake lever, rotatably attached to a middle portion of said brake lever at one end thereof through said connecting pin and extended so as to project from a side end edge of said brake lever at the other end thereof;

a first trunnion pin interposed between the other ends of said pair of support members; and a second trunnion pin attached to said moving member, one end side of said moving member being inserted between said connecting pin and said first trunnion pin, said second trunnion pin coming in slidable contact with the side end edge of said brake lever, said screw member changing a distance between said second trunnion pin and said first trunnion pin to move said moving member by passing said screw member through either one of said first trunnion pin or said second trunnion pin and rotating said screw member.

4. A parking brake device according to claim 2, wherein said screw member has, on one end thereof, a gripping portion which is so shaped as to be easily gripped.

5. A parking brake device according to claim 1, wherein said connecting member is a slide pin slidably inserted into an elongated hole formed in said base member.

* * * * *

UNITED STATES PATENT AND TRADEMARK OFFICE
CERTIFICATE OF CORRECTION

PATENT NO.    : 6,223,624 B1
DATED         : May 1, 2001
INVENTOR(S)   : Yoshihisa Iwanaga et al.

It is certified that error appears in the above-identified patent and that said Letters Patent is hereby corrected as shown below:

<u>Column 3,</u>
Lines 66-67, please delete "(not shown)"

Signed and Sealed this

Twenty-seventh Day of August, 2002

Attest:

Attesting Officer

JAMES E. ROGAN
Director of the United States Patent and Trademark Office